(12) United States Patent
Yamagishi (10) Patent No.: US 12,400,190 B2
(45) Date of Patent: Aug. 26, 2025

(54) INFORMATION PROCESSING APPARATUS, NON-TRANSITORY COMPUTER READABLE MEDIUM STORING PROGRAM, AND INFORMATION PROCESSING METHOD FOR ENABLING DEVICE TO BE USED BASED ON CONTRACT BETWEEN ORGANIZATION AND CONTRACT SOURCE

(71) Applicant: FUJIFILM Business Innovation Corp., Tokyo (JP)

(72) Inventor: Daigo Yamagishi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 618 days.

(21) Appl. No.: 17/523,918

(22) Filed: Nov. 11, 2021

(65) Prior Publication Data

US 2022/0383270 A1 Dec. 1, 2022

(30) Foreign Application Priority Data

May 26, 2021 (JP) .................................. 2021-088286

(51) Int. Cl.
*G06Q 10/20* (2023.01)
*G06F 3/12* (2006.01)

(52) U.S. Cl.
CPC .......... *G06Q 10/20* (2013.01); *G06F 3/1205* (2013.01); *G06F 3/1222* (2013.01); *G06F 3/1238* (2013.01); *G06F 3/1255* (2013.01); *G06F 3/1285* (2013.01)

(58) Field of Classification Search
CPC ..... G06Q 10/20; G06F 3/1205; G06F 3/1222; G06F 3/1238; G06F 3/1255; G06F 3/1285

USPC ................................................... 358/1.1–1.18
See application file for complete search history.

(56) References Cited

U.S. PATENT DOCUMENTS 9,207,897 B2 12/2015 Takatsu et al.
2019/0227760 A1* 7/2019 Sato ...................... G06F 3/1238

FOREIGN PATENT DOCUMENTS

| JP | 4630470 | 2/2011 | |
|---|---|---|---|
| JP | 2011056771 | 3/2011 | |
| JP | 2013054456 | 3/2013 | |
| JP | 2013242848 | 12/2013 | |
| WO | WO-2015051314 A2 * | 4/2015 | ........... G06Q 10/103 |

OTHER PUBLICATIONS

"Notice of Reasons for Refusal of Japan Counterpart Application", issued on Nov. 5, 2024, with English translation thereof, p. 1-p. 6.
"Office Action of Japan Counterpart Application", issued on Jan. 7, 2025, with English translation thereof, p. 1-p. 3.

* cited by examiner

*Primary Examiner* — Gabriel I Garcia
(74) *Attorney, Agent, or Firm* — JCIPRNET (57) ABSTRACT

An information processing apparatus includes a processor configured to receive a processing request for a device from a user, in a case where the received processing request does not correspond to a first usage condition based on a contract with a contract source for the device, acquire a second usage condition based on the contract with the same contract source based on information indicating a relationship between an organization to which the user belongs and the contract source, and control the device to process the processing request based on the acquired second usage condition.

17 Claims, 4 Drawing Sheets

| DEVICE ID | CONTRACT SOURCE NAME | USER COMPANY NAME | CONTRACT DATA | SECURITY SETTING | ... | JOB HISTORY INFORMATION NOTATION | SUBSTANTIAL OBJECT |
|---|---|---|---|---|---|---|---|
| 001 | COMPANY F | COMPANY B | BLACK AND WHITE | UUID | ... | COMPANY B | CONTRACT INFORMATION DATA |
| ... | ... | ... | ... | ... | ... | ... | ... |

(211a spans CONTRACT DATA and SECURITY SETTING; 211 is the overall table)

| DEVICE ID | USER COMPANY NAME | USER ID | JOB TYPE | NUMBER OF PAGES | METER TYPE | ... |
|---|---|---|---|---|---|---|
| 001 | COMPANY B | User002 | PRINT | 5 | BLACK AND WHITE | ... |
| ... | ... | ... | ... | ... | ... | ... |

| USER ID | COMPANY NAME TO WHICH USER BELONGS | CONTRACT SOURCE NAME |
|---------|-------------------------------------|----------------------|
| User002 | COMPANY B | COMPANY F |
| ... | ... | ... |

INFORMATION PROCESSING APPARATUS, NON-TRANSITORY COMPUTER READABLE MEDIUM STORING PROGRAM, AND INFORMATION PROCESSING METHOD FOR ENABLING DEVICE TO BE USED BASED ON CONTRACT BETWEEN ORGANIZATION AND CONTRACT SOURCE

CROSS-REFERENCE TO RELATED APPLICATIONS

This application is based on and claims priority under 35 USC 119 from Japanese Patent Application No. 2021-088286 filed May 26, 2021.

BACKGROUND

(i) Technical Field

The present invention relates to an information processing apparatus, a non-transitory computer readable medium storing a program, and an information processing method.

(ii) Related Art

In recent years, an image forming system has been proposed that enables easy and reliable switching, operation, and management of an image forming apparatus in accordance with a change in a type of a maintenance contract (for example, refer to JP2011-56771A).

The image forming system disclosed in JP2011-56771A is configured with a firmware update module that updates a firmware of an image forming apparatus corresponding to a maintenance contract of the image forming apparatus, a profile instruction module that instructs the image forming apparatus to set a set item corresponding to the maintenance contract and a set value corresponding to the set item, and the image forming apparatus that updates the firmware by reading the firmware update module, reads the profile instruction module, and sets the set item corresponding to the maintenance contract of the image forming apparatus and the set value corresponding to the set item based on the instruction of the profile instruction module.

SUMMARY

Aspects of non-limiting embodiments of the present disclosure relate to an information processing apparatus, a non-transitory computer readable medium storing a program, and an information processing method that enable a device to be used based on a contract between an organization, to which a user belongs, and a contract source in a case where the user belongs to an organization which is contracted with the same contract source even though a processing request for the device from the user does not correspond to a usage condition based on the contract with the contract source with respect to the device.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to receive a processing request for a device from a user, in a case where the received processing request does not correspond to a first usage condition based on a contract with a contract source for the device, acquire a second usage condition based on the contract with the same contract source based on information indicating a relationship between an organization to which the user belongs and the contract source, and control the device to process the processing request based on the acquired second usage condition.

BRIEF DESCRIPTION OF THE DRAWINGS

Exemplary embodiment(s) of the present invention will be described in detail based on the following figures, wherein.

DETAILED DESCRIPTION

Hereinafter, an exemplary embodiment of the present invention will be described with reference to the accompanying drawings. In each drawing, components having substantially identical functions are designated by identical reference numerals, and description thereof will not be repeated.

Summary of Exemplary Embodiment

The information processing apparatus according to the present exemplary embodiment includes a processor configured to receive a processing request for a device from a user, in a case where the received processing request does not correspond to a first usage condition based on a contract with a contract source for the device, acquire a second usage condition based on the contract with the same contract source based on information indicating a relationship between an organization to which the user belongs and the contract source; and control the device to process the processing request based on the acquired second usage condition.

The "contract" refers to a contract that agrees on a usage condition of a device or a maintenance support condition concluded between a side that provides the device as the contract source (for example, a company F) and a side that uses the device (for example, a company A or a company B). The side that uses the device (for example, the company A) may install the device in a shared space and manage the device as a side that manages the device. The shared space indicates a space that can be used by users, who belong to different organizations (for example, the company A and the company B), to share the device. The shared space corresponds to, for example, a shared office, a rental office, a co-working space, and the like. The side that manages the device may be the contract source.

The "first usage condition" refers to a device usage condition based on the contract between the contract source (for example, the company F) and the side that manages and uses the device (for example, the company A). The second usage condition refers to the device usage condition based on the contract between the contract source (for example, the company F) and the side that uses the device (for example, the company B). The side that provides, uses, or manages the device is usually an organization. In the present specification, the organization corresponds to, for example, a company, a university, a private proprietor, or the like.

A case where the processing request "does not correspond to the first usage condition" includes, for example, the following cases.

(a) A case where functional limitation of the device differs between the first usage condition and the second usage condition, and the processing request is a process related to functional limitation.

For example, a case is applied where the processing request is a process related to color printing, scanned image transfer, and security, the first usage condition prohibits the process related to color printing, scanned image transfer, and security, and the second usage condition permits the processing. Here, the process related to color printing, scanned image transfer, and security is an example of a process related to image processing.

(b) A case where the maximum number of uses differs between the first usage condition and the second usage condition and the processing request is a process related to the maximum number of uses.

For example, a case is applied where the maximum number of printed sheets is 50 in the first usage condition but the maximum number of printed sheets is 100 in the second usage condition. Here, the maximum number of printed sheets is an example of the process related to image processing.

(c) A case where a payment unit differs between the first usage condition and the second usage condition.

For example, a case is applied where the same payment as single-sided printing is performed for "N-up printing" for printing N images on one side of one paper in the first usage condition, but payment according to N images is performed in the second usage condition.

The user of the device is not limited to a user belonging to an organization contracted with the contract source, and may be a user who is not contracted with the contract source (including a user belonging to an organization which is not contracted with the contract source). A user who is not contracted with the contract source may execute the process related to security even though the process related to security is not required.

Exemplary Embodiment

Figure 1:
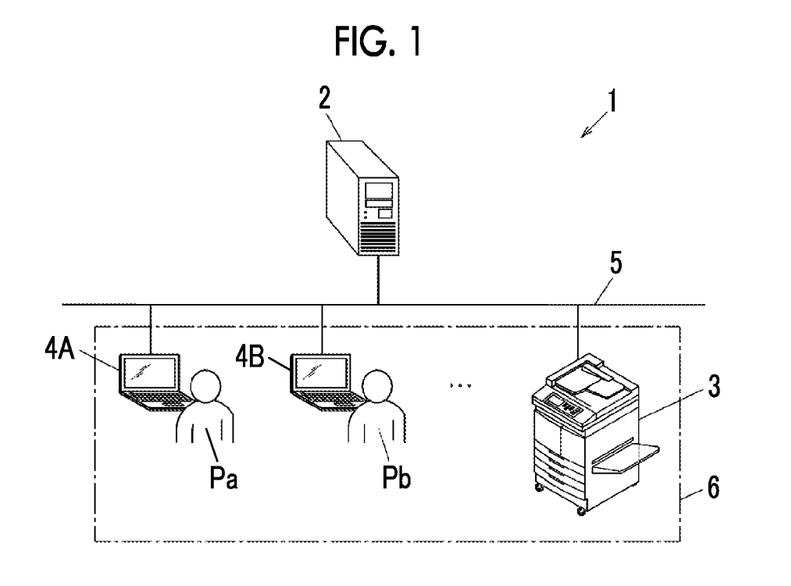
FIG. 1 is a diagram showing a schematic configuration example of an information processing system according to an exemplary embodiment of the present invention.

FIG. 1 is a diagram showing a schematic configuration example of an information processing system according to an exemplary embodiment of the present invention.

An information processing system 1 includes a server 2, a device 3, and a plurality of user terminals 4A and 4B (also collectively referred to as a "user terminal 4") used by users of the device 3. The server 2, the device 3, and the user terminal 4 are connected to each other via a network 5. In the drawing, one device 3 is shown, but a plurality of devices 3 may be used. Further, the user terminal 4 may be connected to the network 5 in a case where the device 3 is used. A control unit 30, which will be described later, of the device 3 is an example of an information processing apparatus.

The device 3 and the plurality of user terminals 4 are installed in a shared space 6. FIG. 1 shows, for example, a case where an employee Pa belonging to a company A uses the user terminal 4A and an employee Pb belonging to a company B uses the user terminal 4B. The company A and the company B are examples of an organization. The employees Pa and Pb are examples of the user.

The server 2 manages a usage situation of the device 3 and performs a payment process according to the usage of the device 3. Here, the "payment process" refers to, for example, a process of subtracting the number of points according to the usage of the device 3 from the number of points held by the user.

The device 3 is, for example, a multifunctional machine having a plurality of functions such as a print function, a scan function, a copy function, an e-mail function, and a facsimile function. The multifunctional machine is an example of an image forming apparatus.

In a case where a job is transmitted from the user terminal 4 or an operation display unit 32, which will be described later, is operated and the job is requested, the device 3 executes the requested job. In a case where execution of the job is completed, the device 3 records the job in a job history information table 311, which will be described later, and transmits job history information to the server 2. The device 3 may transmit the job history information to the server 2 regularly (for example, at 18:00 every day).

The user terminal 4 is an information processing terminal such as a Personal Computer (PC). The user terminal 4 may be a portable information processing terminal such as a notebook computer or a tablet terminal, or a mobile communication terminal such as a multifunctional mobile phone (smartphone).

The network 5 includes, for example, a Local Area Network (LAN), a Wide Area Network (WAN), an intranet, the Internet, or the like, and may be wired or wireless.

Configuration of Server

Figure 2:
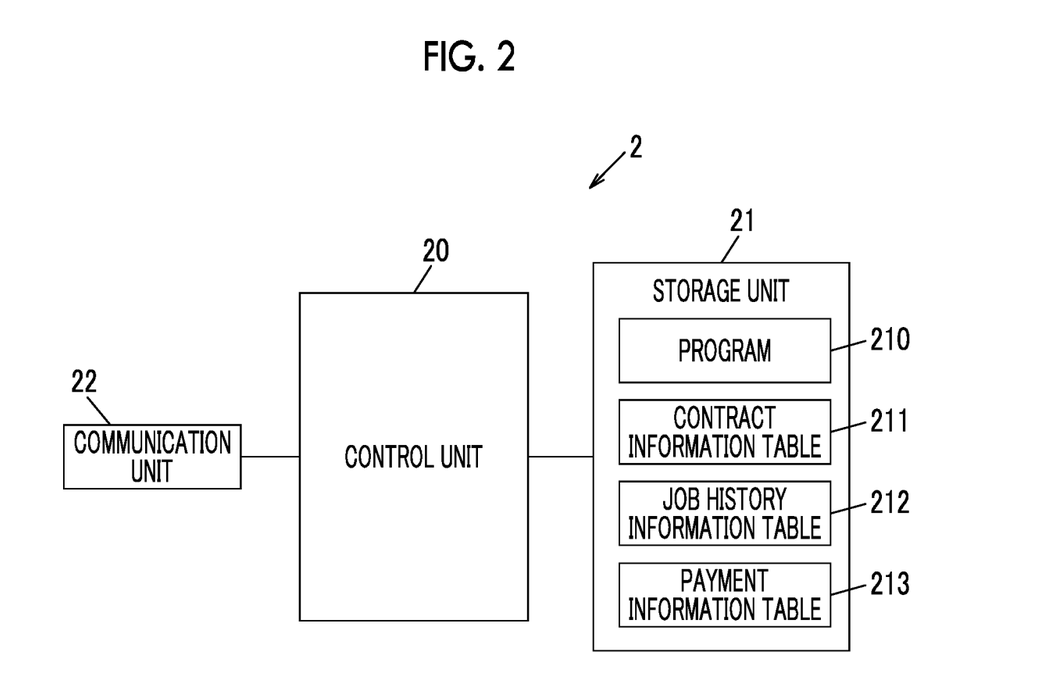
FIG. 2 is a block diagram showing an example of a configuration of a server.

FIG. 2 is a block diagram showing an example of a configuration of the server 2. The server 2 includes a control unit 20, a storage unit 21, and a communication unit 22 connected to the network 5.

The control unit 20 is configured with a processor such as a Central Processing Unit (CPU), an interface, and the like. The processor of the control unit 20 manages the usage situations of the device 3 by executing a program 210 stored in the storage unit 21, and performs the payment process according to the usage of the device 3. In the payment process performed by the control unit 20, the number of printing points according to the printing of a document is subtracted from the number of printing points held by the user based on a job history information table 212 (see FIG. 4), and records the obtained number of printing points in the payment information table 213.

The storage unit 21 is configured with a Read Only Memory (ROM), a Random Access Memory (RAM), a hard disk, and the like, and stores various types of information such as the program 210, a contract information table 211 (see FIG. 3), a job history information table 212 (see FIG. 4), and a payment information table 213. The payment information table 213 records the number of points held by the user for each user ID.

The communication unit 22 communicates with the device 3 and the user terminals 4A and 4B via the network 5.

Figure 3:
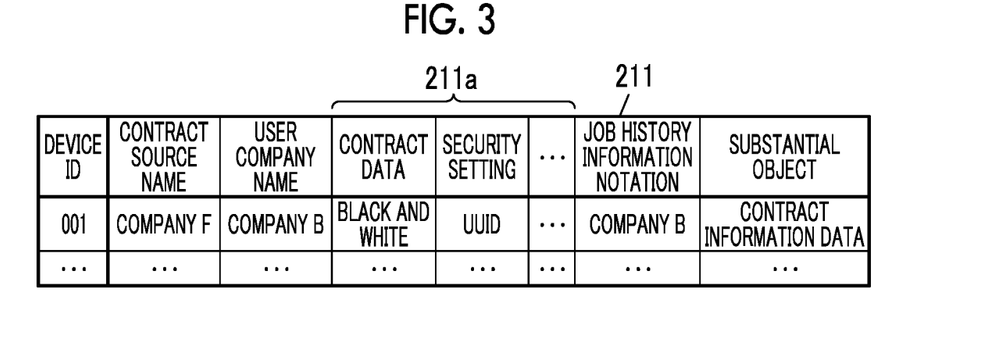
FIG. 3 is a diagram showing an example of a certificate information table held by the server.

FIG. 3 is a diagram showing an example of the contract information table 211 held by the server 2. The contract information table 211 includes a plurality of items such as "device ID", "contract source name", "user company name", "contract data", "security setting", "job history information notation", and "substantial object". The contract information consisting of the items is recorded by the control unit 20 of the server 2 based on content of a contract such as a maintenance contract, or based on an instruction of a manager based on the contract. The contract information indicates that a company, to which the user belongs, concludes the maintenance contract with a company that provides the device 3. The "contract data" and the "security setting" are items related to usage condition 211a, but are not limited thereto. The control unit 20 extracts information related to the usage condition 211a from content of the maintenance contract, and records the information in the "contract data" and the "security setting".

Here, the usage condition 211a based on a contract between the contract source (for example, the company F) and an organization (for example, the company A) that manages the device 3 is an example of a first usage condition. Further, the usage condition 211a based on a contract between the contract source (for example, the company F) and an organization (for example, the company B) that does not manage the device 3 but uses the device 3 is an example of a second usage condition.

The "device ID" is recorded with a device ID that identifies the device 3. The "contract source name" is recorded with a name of a company of the contract source (hereinafter, referred to as a "company name"). The "user company name" is recorded with a name of a company that uses the device 3. The "contract data" is recorded with a set item related to a processing condition executed by the device in the maintenance contract. "Black and white" shown in the drawing indicates that only black and white printing is permitted and color printing is prohibited. The "security setting" is recorded with a set item related to security. "UUID" shown in the drawing is an abbreviation for Universally Unique Identifier, and indicates a setting for printing an ID that identifies a job for each job. The "job history information notation" is recorded with a format for recording the "user company name" in the job history information table 212. The "substantial object" is recorded with a substance of contract information data. The contract information data is data corresponding to respective items of the device ID, the contract source name, the user company name, the contract data, the security setting, and the job history information notation.

Figure 4:
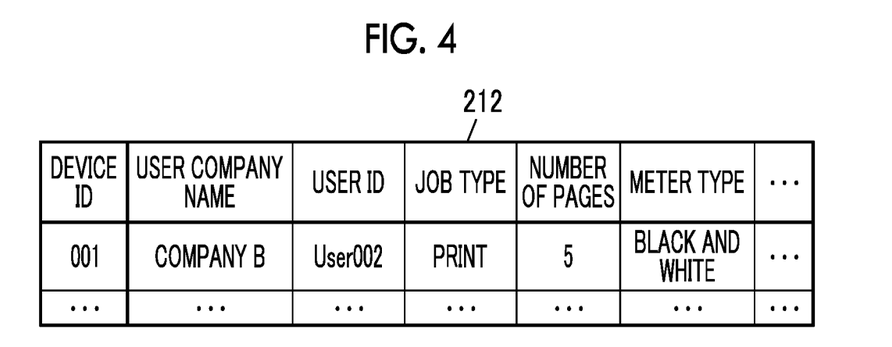
FIG. 4 is a diagram showing an example of a job history information table held by the server.

FIG. 4 is a diagram showing an example of the job history information table 212 held by the server 2. The job history information table 212 includes a plurality of items such as "device ID", "user company name", "user ID", "job type", "number of pages", and "meter type". The job history information consisting of the items is transmitted from the device 3 regularly (for example, at 18:00 every day) or after the job is executed, and is recorded by the control unit 20.

The "device ID" is recorded with a device ID that identifies the device 3. The "user company name" is recorded with a name of a company that uses the device 3. The "user ID" is recorded with a user ID that identifies the user. The "job type" is recorded with a type of the job, and the "number of pages" is recorded with the number of pages of a document executed with the job. The "meter type" is recorded with a type of a meter having a different payment (for example, a first meter for black and white printing and a second meter for color printing).

Configuration of Device

Figure 5:
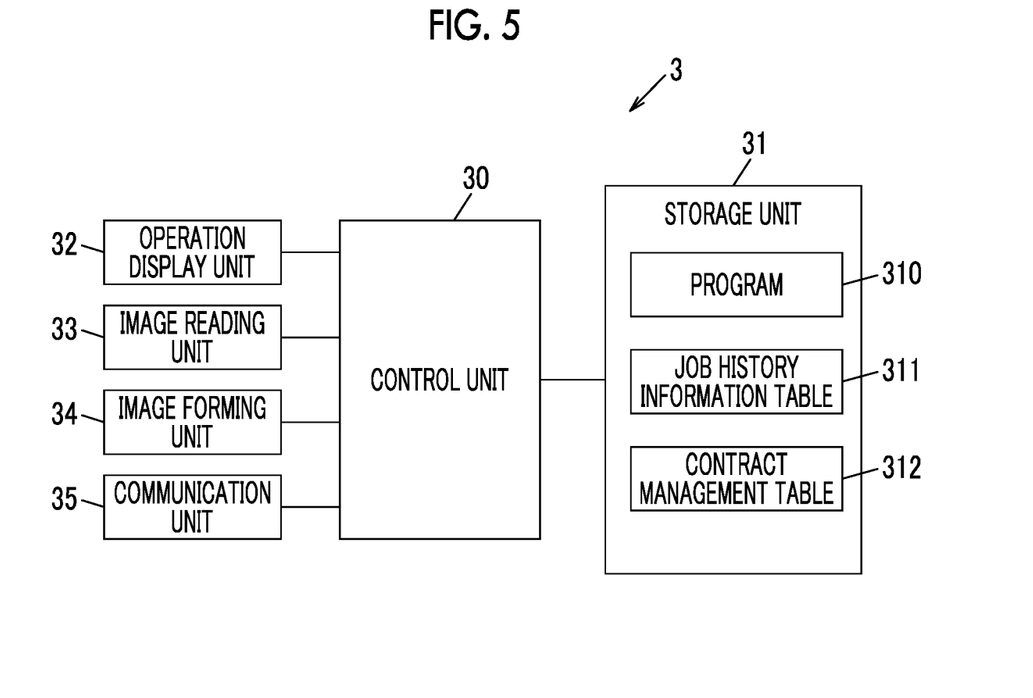
FIG. 5 is a block diagram showing an example of a configuration of a device.

FIG. 5 is a block diagram showing an example of a configuration of the device 3. The device 3 includes a control unit 30 that controls each unit of the device 3, and a storage unit 31, an operation display unit 32, an image reading unit 33, an image forming unit 34, and a communication unit 35 are connected to the control unit 30.

The control unit 30 is configured with a processor such as a CPU, an interface, and the like. The processor of the control unit 30 executes a job, such as a print job, a scan job, a copy job, or a scanned image transfer job, by executing a program 310 stored in the storage unit 31. Each of the print job and the copy job is also referred to as a print job. The print job, the scan job, and the copy job are examples of a processing request.

Figure 8:
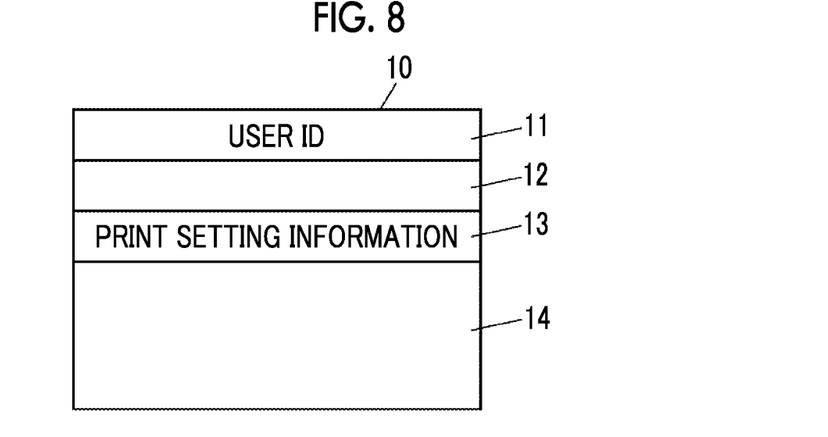
FIG. 8 is a diagram showing an example of a configuration of a print job.

The print job is a job of printing and outputting print data included in the job transmitted from the user terminal 4 on paper by the image forming unit 34. As shown in FIG. 8, which will be described later, the print job 10 includes attribute information 11 such as a user ID requesting a job, certificate information 12, print setting information 13, and print data 14.

The scan job is a job of reading image data (also referred to as a scanned image) from a document by the image reading unit 33. The copy job is a job of printing and outputting the scanned image obtained by the scan job on the paper by the image forming unit 34.

The scanned image transfer job is a job of transferring a scanned image, which is obtained by reading the document by the image reading unit 33, to a designated transfer destination.

The storage unit 31 is configured with a ROM, a RAM, a hard disk, and the like, and stores various types of information such as a program 310, a job history information table 311, and a contract management table 312 (see FIG. 5). The job history information table 311 is recorded with the job history information, which is related to the device 3, in the job history information table 212 shown in FIG. 4.

The operation display unit 32 inputs and displays information. The operation display unit 32 is, for example, a touch panel display, and has a configuration in which a touch panel is arranged to be superimposed on a display such as a liquid crystal display.

The image reading unit 33 includes an automatic paper feeding device provided on a platen, and a scanner that optically reads the scanned image from a document placed on the platen or a document sent by the automatic paper feeding device.

The image forming unit 34 creates a printed matter by forming an image on the paper fed from a paper feed cassette using, for example, an electrophotographic method, an inkjet method, or the like. As shown in FIG. 8, the image forming unit 34 converts the print data 14 described in a Page Description Language (PDL) into image data consisting of raster data, and prints the image data on the paper according to the print setting information 13 included in the print job 10.

The communication unit 35 is connected to the server 2, the device 3, and the user terminal 4 via the network 5.

The communication unit 35 includes a Network Interface Card (NIC), a modem, and the like, communicates with the server 2, the user terminals 4A and 4B, and an external device via the network 5 using the NIC, and performs modulation and demodulation on a signal required for facsimile communication using the modem to perform the facsimile communication with an external communication device via the network 5.

Figure 6:
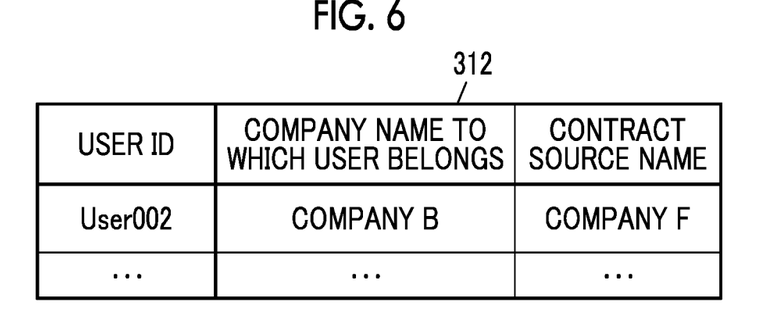
FIG. 6 is a diagram showing an example of a contract information table held by the device.

FIG. 6 is a diagram showing an example of the contract management table 312 held by the device 3. The contract management table 312 includes respective items of "user ID", "company name to which user belongs", and "contract source name". The contract information consisting of the items is recorded by the control unit 30 based on the operation of the manager. An item of a company name (for example, the company A) that manages the device 3 may be provided.

The "user ID" is recorded with a user ID that identifies the user, and the "company name to which user belongs" is recorded with a company name (for example, the company B) to which the user belongs. The "contract source" is recorded with a company name (for example, a company F) of the company that provides the device 3 that has the maintenance contract with the company to which the user belongs.

The control unit 30 receives a processing request from the user, and determines whether or not the received processing request corresponds to a usage condition (hereinafter, also referred to as a first usage condition) included in the certificate information 12 based on the maintenance contract between the contract source (for example, the company F) for the device 3 and the organization that manages the device 3 (for example, the company A). In a case where the processing request does not correspond to the first usage condition, the control unit 30 acquires a usage condition (hereinafter, also referred to as a second usage condition) included in the certificate information 12 based on the maintenance contract between the same contract source (for example, the company F) and the organization (for example, the company B) to which the user belongs based on the contract management table 312, and controls the device 3 to process the processing request based on the acquired second usage condition.

Configuration of User Terminal

Figure 7:
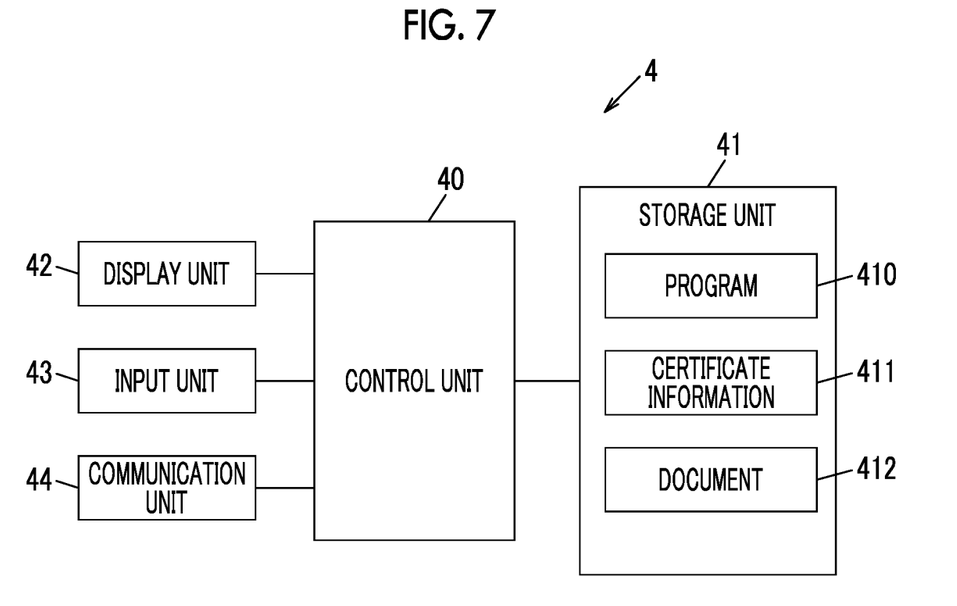
FIG. 7 is a block diagram showing an example of a configuration of a user terminal.

FIG. 7 is a block diagram showing an example of a configuration of the user terminal 4. The user terminal 4 includes a control unit 40 that is realized by a processor such as a CPU, an interface, or the like, and controls each unit of the user terminal 4, a storage unit 41 that stores various types of information such as a program 410 of a processor, certificate information 411, and a document 412 to be printed, a display unit 42 that is realized by a liquid crystal display or the like, an input unit 43 that is realized by a keyboard, a mouse, or the like, and a communication unit 44 that communicates with the server 2 and the device 3 via the network 5.

The program 410 stored in the storage unit 41 includes a printer driver and the like. Further, the certificate information stored in the storage unit 41 is certificate information for verifying the user or the organization to which the user belongs, is generated and issued by the server 2 to correspond to the user or the organization to which the user belongs, and is acquired and stored by the user terminal 4.

The control unit 40 generates various jobs, such as the print job 10 (see FIG. 8), based on an operation of the user.

FIG. 8 is a diagram showing an example of a configuration of the print job 10. The print job 10 includes attribute information 11, certificate information 12, print setting information 13, and print data 14. The attribute information 11 includes the user ID that instructs the print job 10. The certificate information 12 is obtained by reading the certificate information 411 stored in the storage unit 41 of the user terminal 4 and is given to the print job 10. The print data 14 is written in the Page Description Language (PDL), in which the document can be interpreted by the device 3, by a printer driver.

Operation of Information Processing System

Figure 9:
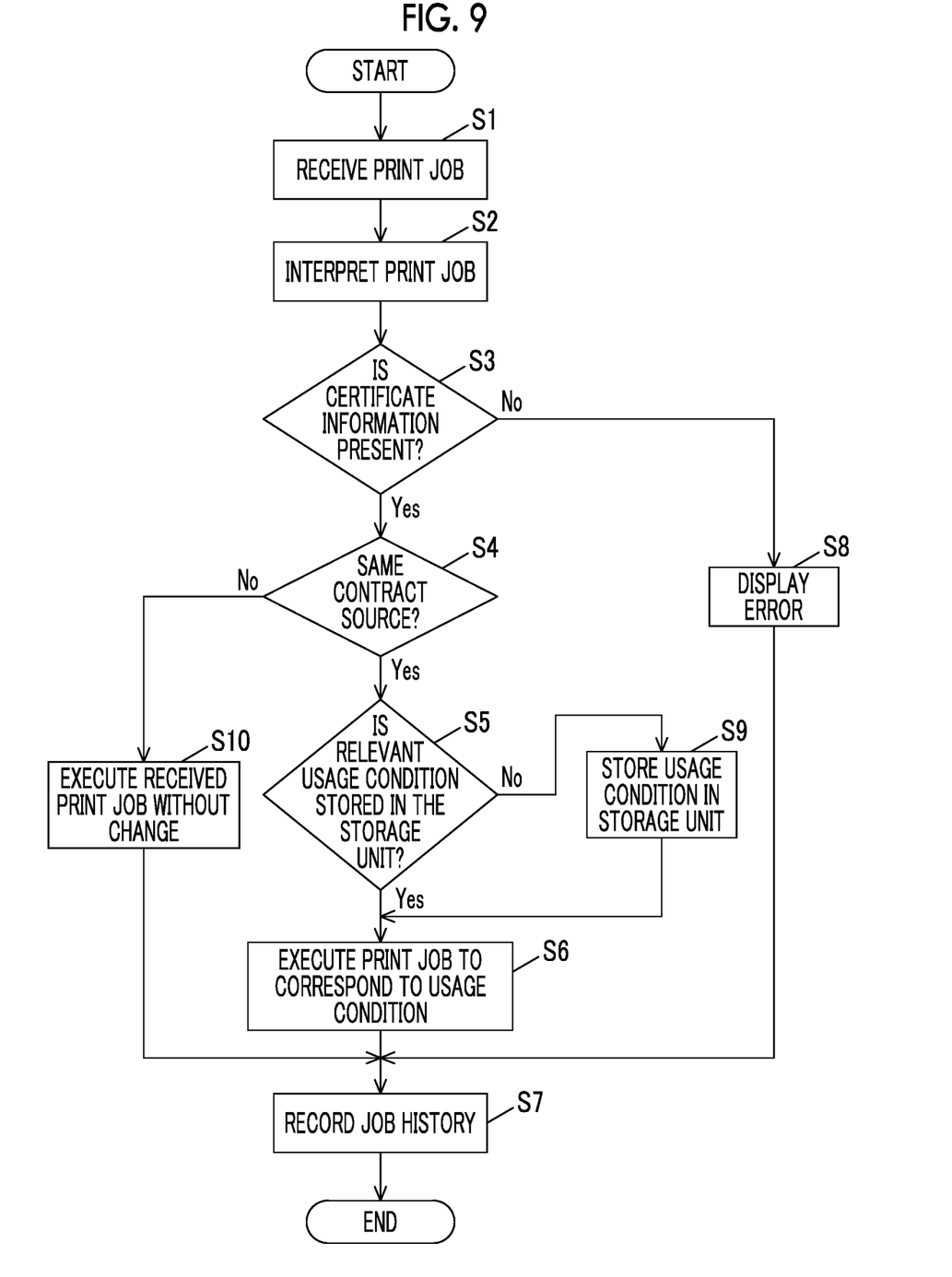
FIG. 9 is a flowchart showing an example of an operation of the information processing system.

Next, an example of an operation of the information processing system 1 will be described with reference to FIG. 9. FIG. 9 is a flowchart showing an example of the operation of the information processing system 1. Hereinafter, a case where the print job is executed as the processing request will be described.

(1) Generation of Print Job

In a case where the user operates the input unit 43 of the user terminal 4, selects the document 412 to be printed, and instructs execution of the print job, the control unit 40 converts the document 412 into the print data 14 consisting of the PDL, reads the certificate information 411 from the storage unit 41, and generates the print job 10. As shown in FIG. 8, the print job 10 includes the user ID, the certificate information 12, the print setting information 13, and the print data 14. In a case where the certificate information 411 is requested to be verified by the server 2 and is verified, the contract information may be acquired from the server 2. In this case, the contract information may be included in the print job 10 instead of the certificate information 411.

(2) Execution of Print Job

In a case where the print job 10 is transmitted from the user terminal 4 to the device 3 and the control unit 30 of the device 3 receives the print job 10 from the user terminal 4 (S1), the print job 10 is interpreted (S2), and it is determined whether or not the certificate information 12 is included in the print job 10 (S3).

In a case where the certificate information 12 is included in the print job 10 (S3: Yes), the certificate information 12 is read and the server 2 is requested to verify the certificate information 12. At this time, the certificate information 12 is transmitted to the server 2 together with the user ID. The certificate information is verified by the server 2, and the contract information described in the contract information table 211 corresponding to the certificate information is acquired. With reference to the acquired contract information, it is determined by referring to the contract management table 312 whether or not the contract source of the acquired contract information is the same as the company that provides the device 3 to be used (S4).

For example, in a case where the user is the employee Pb (the user ID is User002) of the company B, the contract source name included in the contract management table 312 in the acquired contract information is the company F, so that it is determined to be the same as the company that provides the device 3 to be used.

In a case of the same contract source (S4: Yes), it is determined whether or not the storage unit 31 stores information related to the usage condition included in the contract information that can be acquired in a case where verification is performed using the certificate information 12 included in the print job 10 (S5).

In a case where the usage condition is stored in the storage unit 31 (S5: Yes), the control unit 30 determines that, for example, the print job 10 requested by the employee Pb of the company B corresponds to the usage condition 211b based on a contract of the company B, which makes the company (for example, the company A) which manages the device 3 be the same as the contract source (for example, the company F), and executes the print job 10 to correspond to the usage condition 211a (S6). For example, in the company B, in a case where the processing permitted in the contract data of the usage condition 211a is black and white printing and the color printing is prohibited, black and white printing is executed even in a case where the print setting information 13 includes the color printing.

In step S3, in a case where the print job 10 does not include the certificate information 12 or verification by the server 2 fails (S3: No), the control unit 30 performs error display with respect to the operation display unit 32 or the display unit 42 of the user terminal 4 (S8).

In step S4, in a case where of a different contract source (S4: No), the print job 10 received as a guest user executes a job process based on a usage condition set with respect to the guest user by a device manager (S10). In a case of the different contract source (S4: No), an error may be displayed without executing the print job.

In step S5, in a case where the information related to the usage condition is not stored in the storage unit 31 (S5: No), the control unit 30 transmits the certificate information to the server 2 to request verification, and stores contract information, which is acquired based on the verification, in the storage unit 31 (S9).

The print job 10 is executed to correspond to the usage condition 211a included in the certificate information 12 newly stored in the storage unit 31 (S6). For example, even in a case where color printing is not allowed in the company A, in a case where color printing is allowed in the contract data of the usage condition 211a in the company B and in a case where black and white printing is designated in the print setting information 13, black and white printing is executed, and, in a case where color printing is designated in the print setting information 13, color printing is executed.

(3) Job History Recording Process

In a case where the execution of the print job 10 is completed, the control unit 30 transmits the job history information to the server 2. The server 2 records the received job history information (S7). The server 2 performs the payment process according to the print job 10.

First Modification Example

In the above exemplary embodiment, the case where the control unit 30 of the device 3 functions as an information processing apparatus has been described, but the server 2 may function as an information processing apparatus. That is, in a case where the server 2 receives the processing request for the device 3 from the user and the received processing request does not correspond to the first usage condition based on the contract with the contract source for the device 3, the device 3 may be controlled to acquire the second usage condition based on the contract with the same contract source based on the information indicating the relationship between the organization to which the user belongs and the contract source and to process the processing request based on the acquired second usage condition.

Second Modification Example

In the above exemplary embodiment, the print job 10 includes the certificate information 12, but the contract information may be acquired from the server 2 by recording information (for example, a URL) indicating an acquisition destination (for example, the server 2) of the contract information instead of the certificate information 12, performing an authentication request in such a way that the control unit 30 of the device 3 accesses the URL and transmits the user information, authentication is performed using the user information.

Although the exemplary embodiment of the present invention has been described above, the exemplary embodiment of the present invention is not limited to the above exemplary embodiment, and various modifications and implementations are possible.

A part or all of each means of the processor may be configured with a hardware circuit such as a Field Programmable Gate Array (FPGA) or an Application Specific Integrated Circuit (ASIC).

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

In addition, some of the components of the above exemplary embodiment may be omitted or changed. Further, in the flow of the above exemplary embodiment, steps may be added, deleted, changed, replaced, or the like. Further, the program used in the above exemplary embodiment can be recorded and provided on a computer-readable recording medium, such as a CD-ROM, and can be stored in an external server such as a cloud server, to be used via a network.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor configured to:
   receive a processing request for a device from a user who belongs to a first organization;
   in a case where the received processing request does not correspond to a first usage condition based on a first contract, acquire a second usage condition based on a second contract, wherein the first contract is an agreement between a second organization that manages the device and a third organization that provides the device, and the second contract is an agreement between the third organization and the first organization that uses the device; and
   control the device to process the processing request based on the acquired second usage condition.

2. The information processing apparatus according to claim 1,
wherein the second usage condition is acquired based on the processing request.

3. The information processing apparatus according to claim 2, wherein the processing request includes the second usage condition, and the second usage condition is acquired from the processing request.

4. The information processing apparatus according to claim 2, wherein the processing request includes information associated with the second usage condition, and the information is acquired from the processing request, and the second usage condition is acquired from the acquired information.

5. The information processing apparatus according to claim 4, wherein the information is information indicating an acquisition destination of the second usage condition.

6. The information processing apparatus according to claim 1, further comprising:

a storage unit that stores a process performed based on the second usage condition as history information.

7. The information processing apparatus according to claim 6, wherein the processor is configured to:

in a case where the second usage condition is acquired, store the second usage condition in the storage unit.

8. The information processing apparatus according to claim 1, wherein a case where the processing request does not correspond to the first usage condition is a process related to image processing.

9. The information processing apparatus according to claim 8, wherein the process related to image processing includes color printing, a maximum number of printed sheets, or scanned image transfer.

10. The information processing apparatus according to claim 8, wherein the process related to image processing includes a process related to security.

11. The information processing apparatus according to claim 1, wherein, in a case where the processing request is received from a user who is not contracted with the third organization, the received processing request is processed with the user as a guest user.

12. The information processing apparatus according to claim 11, wherein the guest user is limited in functions that can be used as compared with the first usage condition.

13. The information processing apparatus according to claim 12, wherein the limited function includes color printing, a maximum number of printed sheets, or scanned image transfer.

14. The information processing apparatus according to claim 12, wherein a process related to security is applied without limitation.

15. The information processing apparatus according to claim 1, wherein the processor is configured to:

in a case where it is not possible to correspond to the acquired second usage condition, not execute the received processing request.

16. A non-transitory computer readable medium storing a program causing a computer to execute a process comprising:

receiving a processing request for a device from a user who belongs to a first organization;

acquiring, in a case where the received processing request does not correspond to a first usage condition based on a first contract, a second usage condition based on a second contract, wherein the first contract is an agreement between a second organization that manages the device and a third organization that provides the device, and the second contract is an agreement between the third organization and the first organization that uses the device; and controlling the device to process the processing request based on the acquired second usage condition.

17. An information processing method comprising:

receiving a processing request for a device from a user who belongs to a first organization;

acquiring, in a case where the received processing request does not correspond to a first usage condition based on a first contract, a second usage condition based on a second contract, wherein the first contract is an agreement between a second organization that manages the device and a third organization that provides the device, and the second contract is an agreement between the third organization and the first organization that uses the device; and controlling the device to process the processing request based on the acquired second usage condition.

* * * * *